(12) United States Patent
Doyle et al.

(10) Patent No.: US 7,558,770 B2
(45) Date of Patent: Jul. 7, 2009

(54) METHOD AND SYSTEM TO DETECT APPLICATION NON-CONFORMANCE

(75) Inventors: Ronald P. Doyle, Raleigh, NC (US); David L. Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 11/466,610

(22) Filed: Aug. 23, 2006

(65) Prior Publication Data
US 2008/0125878 A1  May 29, 2008

(51) Int. Cl.
*G06F 17/00* (2006.01)
*G06N 5/00* (2006.01)

(52) U.S. Cl. ...................................................... 706/45
(58) Field of Classification Search ........................ None
See application file for complete search history.

(56) References Cited

U.S. PATENT DOCUMENTS

| | | | |
|---|---|---|---|
| 5,313,616 A * | 5/1994 | Cline et al. .................. | 717/127 |
| 5,619,716 A | 4/1997 | Nonaka et al. | |
| 5,673,252 A * | 9/1997 | Johnson et al. ............. | 370/449 |
| 6,108,494 A | 8/2000 | Eisenhofer et al. | |
| 6,181,679 B1 | 1/2001 | Ashton et al. | |
| 6,691,064 B2 * | 2/2004 | Vroman ...................... | 702/183 |
| 6,766,481 B2 * | 7/2004 | Estep et al. ................. | 717/124 |
| 6,810,406 B2 * | 10/2004 | Schlabach et al. .......... | 707/201 |
| 6,950,829 B2 * | 9/2005 | Schlabach et al. ........ | 707/104.1 |
| 6,959,235 B1 * | 10/2005 | Abdel-Malek et al. ........ | 701/33 |
| 6,970,876 B2 * | 11/2005 | Hotti et al. .................. | 707/101 |
| 7,054,885 B1 * | 5/2006 | Hoffman et al. ......... | 707/103 Y |
| 7,184,917 B2 * | 2/2007 | Pramanick et al. .......... | 702/120 |
| 7,197,417 B2 * | 3/2007 | Pramanick et al. .......... | 702/119 |
| 7,209,817 B2 * | 4/2007 | Abdel-Malek et al. ........ | 701/33 |

(Continued)

FOREIGN PATENT DOCUMENTS

WO  2005010755 A2  2/2005

(Continued)

OTHER PUBLICATIONS

Bill-of-material configuration generation Blaha, M.R.; Premeriani, W.J.; Bender, A.R.; Salemme, R.M.; Kornfein, M.M.; Harkins, C.K.; Data Engineering, 1990. Proceedings. Sixth International Conference on Feb. 5-9, 1990 pp. 237-244 Digital Object Identifier 10.1109/ICDE.1990.113474.*

(Continued)

*Primary Examiner*—Michael B Holmes
(74) *Attorney, Agent, or Firm*—Cantor Colburn LLP IBM RSW

(57) ABSTRACT

A method to anticipate and prevent application non-conformance is disclosed. The method includes making available a configuration management database (CMDB) having configuration information of a plurality of system resources and dependency information of a plurality of applications related to the plurality of system resources. The method also includes making available a plurality of rules to establish a plurality of operating conditions that are statistically probable to cause a non-conformance of each system resource of the plurality of system resources, and combining each rule with the CMDB to determine the dependency of each application upon each operating condition. The method proceeds with performing a response action in response to determining that any of the operating conditions are such to cause a statistically probable non-conformance of any of the plurality of applications.

14 Claims, 1 Drawing Sheet

U.S. PATENT DOCUMENTS

| | | | |
|---|---|---|---|
| 7,209,851 B2 * | 4/2007 | Singh et al. | 702/119 |
| 7,266,515 B2 * | 9/2007 | Costello et al. | 705/27 |
| 7,333,866 B2 * | 2/2008 | Knight | 700/96 |
| 7,346,536 B2 * | 3/2008 | Kubota | 705/10 |
| 7,370,190 B2 * | 5/2008 | Calhoon et al. | 713/2 |
| 7,483,898 B2 * | 1/2009 | Abdo et al. | 707/10 |
| 2006/0004875 A1 * | 1/2006 | Baron et al. | 707/200 |

OTHER PUBLICATIONS

Inferring change effort from configuration management databases Graves, T.L.; Mockus, A.; Software Metrics Symposium, 1998. Metrics 1998. Proceedings. Fifth International Nov. 20-21, 1998 pp. 267-273 Digital Object Identifier 10.1109/METRIC.1998.731253.*

Implementing ITIL-Based CMDB in the Organizations to Minimize or Remove Service Quality Gaps Sharifi, M.; Ayat, M.; Sahibudin, S.; Modeling & Simulation, 2008. AICMS 08. Second Asia International Conference on May 13-15, 2008 pp. 734-737 Digital Object Identifier 10.1109/AMS.2008.144.*

A low cost configuration management database using commercial off the shelf (COTS) open database compliant (ODBC) software [for active array measurement test bed] Couper, P.; McKim, G.; Thompson, K.; Autotestcon '99. IEEE Systems Readiness Technology Conference, 1999. IEEE Aug. 30-Sep. 2, 1999 pp. 67-71.*

A database for configuration management Heidenreich, G.; Kips, D.; Volle, V.; Database and Expert Systems Applications, 1996. Proceedings., Seventh International Workshop on Sep. 9-10, 1996 pp. 243-248 Digital Object Identifier 10.1109/DEXA.1996.558304.*

* cited by examiner

METHOD AND SYSTEM TO DETECT APPLICATION NON-CONFORMANCE

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to computer system performance, and particularly to detection of non-conformance of computer systems.

2. Description of Background

Before our invention, methods to predict system response have been developed to detect and predict the response of a system resource to a particular operating condition. However, current methods of prediction of system resource non-conformance lack the capability to predict and determine the resulting effect of the non-conformance of the system resource. Accordingly, the state of the art will be advanced by a non-conformance detection system that overcomes these drawbacks.

SUMMARY OF THE INVENTION

The shortcomings of the prior art are overcome and additional advantages are provided through the provision of a method and system utilizing the CMDB to predict which applications will be affected by a non-conforming system resource.

An embodiment of the invention includes a method to anticipate and prevent application non-conformance. The method includes making available a configuration management database (CMDB) having configuration information of a plurality of system resources and dependency information of a plurality of applications related to the plurality of system resources. The method also includes malting available a plurality of rules to establish a plurality of operating conditions that are statistically probable to cause a non-conformance of each system resource of the plurality of system resources, and combining each rule with the CMDB to determine the dependency of each application upon each operating condition. The method proceeds with performing a response action in response to determining that any of the operating conditions are such to cause a statistically probable non-conformance of any of the plurality of applications.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

Technical Effects

As a result of the summarized invention, technically we have achieved a solution which will predict statistically probable non-conformance of an application program in response to a plurality of operating conditions. Accordingly, such prediction will allow an appropriate response to be developed to minimize or eliminate any effect that may be caused by the plurality of operating conditions. This will provide enhanced system stability, reliability, and performance as a result of improved system resource utilization.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

An embodiment of the invention provides a method of improving non-conformance detection and anticipation based on configuration information stored in a Configuration Management Database (CMDB). The CMDB provides a mechanism for specifying configuration artifacts, such as hardware, and the software applications running on the hardware, and dependencies among artifacts. An embodiment of the invention will analyze dependencies stored in the CMDB, runtime metrics, and performance rules to predict and avoid non-conformance.

In an embodiment, in combination with the CMDB, rules specify items such as "when a TCP/IP network is 70 percent loaded, it is statistically probable to behave in a non-conforming manner". In an embodiment, the rules, in combination with the CMDB, also specify the statistical probability of non-conformance of an application, such as "when the network is 70 percent loaded, although the network performance may be conforming, an application running on a server connected to that network is statistically probable to act in a non-conforming manner", for example. An embodiment of the invention will inspect the rule and the CMDB to determine the actual dependencies of the installed instance of the software applications. In an embodiment, a CMDB-based non-conformance anticipation system (also herein referred to as an anticipation system) then determines if any of the relevant metrics, or operating conditions, of any of a plurality of resources, on any application that has a declared dependency (as stored in the CMDB), are statistically probable to act in a non-conforming manner.

In an embodiment, in response to determining that an application is statistically probable to act in a non-conforming manner, an action is taken. In another embodiment, when a non-conformance is anticipated, the anticipation system can query the CMDB to find an alternate resource. In such a case, the anticipation system identifies the resource that is likely to cause non-conformance, and queries the CMDB to find an alternate resource that is identical or sufficiently similar. In an embodiment, the application is moved from the problematic resource to the alternate resource.

Figure 1:
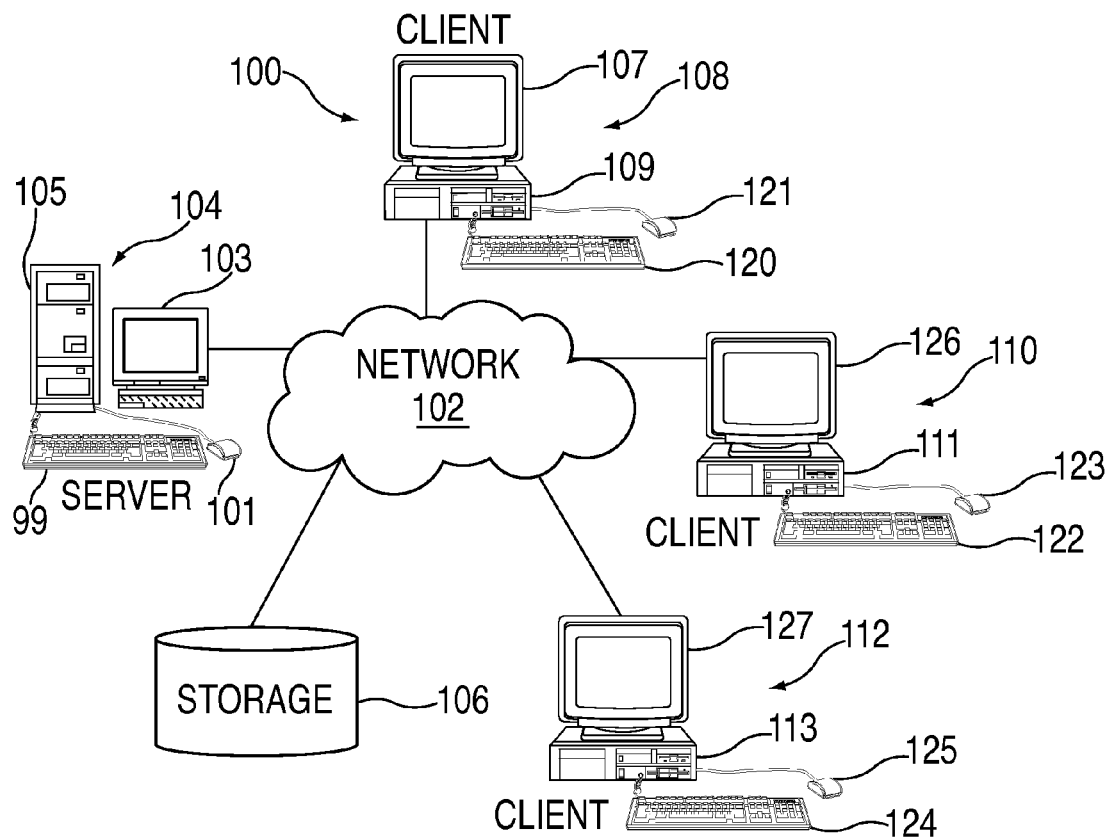
FIG. 1 illustrates one example of a distributed data processing system in which the present invention may be implemented.

With reference now to the figures, and in particular with reference to FIG. 1, a pictorial representation of a distributed data processing system in which the present invention may be implemented is depicted.

Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, temporary connections made through telephone connections, or wireless connections, for example.

In the depicted example, a server 104 is connected to the network 102 along with storage unit 106. In addition, clients 108, 110, and 112 also are connected to the network 102. These clients 108, 110, and 112 may be, for example, personal computers or network computers. In the depicted example, server 104 provides data, such as boot files, operating system images, and applications to clients 108, 110, and 112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational, and other computer systems, that route data and messages. Of course, distributed data processing system 100 also may be implemented as a number of different types of networks, such as, for example, an Intranet or a local area network.

Each computer 104, 108, 110, 112 within the data processing system 100 may have a program storage device 105, 109, 111, 113 to store system, data, and application files, an output device, such as a CRT display screen 103, 107, 126, and 127, for example, and input devices, such as keyboards 99, 120, 122, and 124, for example and mice 101, 121, 123, 125, for example.

FIG. 1 is intended as an example, and not as an architectural limitation for the processes of the present invention.

In an embodiment, the CMDB may be stored on any one of the storage devices 105, 106, 109, 111, 113 of the data processing system 100. The CMDB provides a mechanism for specifying configuration artifacts and dependencies among artifacts. In an embodiment, at the highest level, the CMDB may store the configuration of a business application. Below the application, it may store the dependencies between hardware and software, such as servers, routers, and application server software, for example. Below that, the CMDB may store items on which the hardware and software depend, and so on. In an embodiment, for example, the CMDB will store information regarding the computing topology, such as a specific manufacture server running a particular web application server, having a given system configuration, and a specific plurality of applications installed and running, for example.

As a result of experience, background, and manufacturers' recommendations, Information Technology (IT) administrators typically have information regarding the effect that operating conditions, which may also be referred to as runtime metrics, may have on the resources within the data processing system 100. In an embodiment, this information is compiled into a plurality of rules that establish which operating conditions are likely, or statistically probable, to cause a non-conformance of each system resource and each application running within the data processing system 100. As used herein, the term system resource shall refer to any hardware or software components of the data processing system 100, such as processors, memory, peripheral devices, interfaces, databases, operating system, or any other resource that may be required to maintain expected application performance, for example. The preceding list of components is for illustration, and not limitation. As used herein, the term non-conformance shall refer to any output or behavior of any one of the components or applications that is not as expected or desired.

As an example, it may be understood by an IT administrator of a specific data processing system, that in response to a loading of 70 percent on the network 102, there is a statistical probability that the behavior of the network 102 will become non-conforming. Accordingly, the rule would specify that in response to a 70 percent load on the network, there is a statistical probability that the behavior of the network will become nonconforming. As used herein, the term operating conditions shall refer to any of a set of measurable factors that may effect the performance of any of the components of the data processing system 100. Examples of operating conditions may include, but not be limited to, network traffic, component temperature, available memory, processor load, and disk drive fragmentation, for example.

In an embodiment, the CMDB will contain information relating the dependency of any of a plurality of applications that may be running upon conforming performance of each of the plurality of system resources within the data processing system 100.

In an embodiment of the invention, each rule relating the statistical probability of the non-conformance of any of the plurality of system resources is combined, by a CMDB-based non-conformance anticipation system, running within the data processing system 100, with dependency information within the CMDB to determine the effect that operating conditions may have upon the conforming of each application running within the data processing system 100.

In an embodiment of the invention, the anticipation system is configured to directly monitor and determine, via the data processing system 100, if any of the operating conditions are such that a statistically probable non-conformance of any of the plurality of system resources will result in a subsequent statistically probable non-conformance of any of the plurality of applications running on the data processing system 100. Further, in an embodiment, the anticipation system is configured, in response to determining that any of the operating conditions are such to cause a statistically probable non-conformance of any of the plurality of applications, perform a response action, such as notifying an administrator of the impending application non-conformance, for example.

While an embodiment of the invention has been described performing a response action of notifying an administrator, it will be appreciated that the scope of the invention is not so limited, and that the invention will also apply to anticipation systems that may perform the response action of displaying a warning screen, flashing a light, dialing a telephone number, or other means of making users or administrators aware that operating conditions are such that an application may begin to behave in a non-conforming manner. Further, as used herein, the term "administrator" is not limited necessarily to a person employed or having the role of a system administrator, but may also refer to any party that is interested in the continued performance of any application or component within the data processing system 100, such as a user, a manager, or a technician, for example.

In an alternate embodiment of the invention, the anticipation system is configured to query a monitoring program that is configured to monitor and store the operating conditions of each of the system resources.

Following is an illustrative example of the CMDB-based non-conformance anticipation system. It will be appreciated that one of the resources within an exemplary data processing system 100 is a first router, used to connect multiple servers 104 and clients 108 to the network 102. It will be further appreciated that in response to a specific operating condition, such as a specific throughput level, of 90 percent of maximum throughput, for example, the first router will begin to perform in a non-conforming manner. It will be further appreciated that if the CMDB specifies that a particular business application is dependent upon proper router operation, that the non-conforming behavior of the first router will result in non-conforming performance of the business application.

While an embodiment of the invention has been described detailing the non conforming response of a router to specific operating conditions, it will be appreciated that the scope of the invention is not so limited, and that the invention will also apply to any resource that is necessary to maintain expected performance of an application, such as memory, processors, and hard-drives, for example.

In an embodiment, the anticipation system is configured to query the CMDB to determine if an alternate resource may be utilized to support continued conformance, or operation, of any of the plurality of applications determined to be statistically probable to non-conform as a result of the dependency of any of the plurality of application upon the system resource. In an embodiment, the anticipation system is configured to shift the dependency of any of the applications that are dependent upon the system resource that is statistically probable to non-conform, to the alternate resource, thereby providing continued operation of the application, despite subsequent non-conformance of the system resource upon which the application was originally dependent.

Continuing the example presented above, it will be appreciated that in response to the first router attaining a 90 percent throughput level, the anticipation system is configured to query the CMDB to determine if the alternate resource, such as a second router, for example, is available to support the specific business application. It will be appreciated that the anticipation system will be configured to take any necessary steps to shift the specific business application from depending upon the first router to depending upon the second router, such as an initialization routine, for example.

In an embodiment, the anticipation system is configured to provide a plurality of response actions, with each response action corresponding to a different level of statistical probability of application non-conformance. In the example provided above, the anticipation system can be configured to send a notification email via the network 102 to the IT administrator when the first router throughput is 60 percent, and to send a warning to the administrator when the first router throughput is 70 percent. In this way, it will provide the IT administrator an opportunity to investigate, and perhaps respond to the increasing throughput of the first router. In an embodiment, the anticipation system is configured to take still further action, such as when the first router throughput reaches 80 percent. For example, the anticipation system may query the CMDB to determine if there are actions that can be taken to reduce the first router throughput without increasing the statistical probability of non-conformance of any of the plurality of applications in operation. Finally, for example, if the first router throughput reaches 90 percent, the anticipation system is configured to shift the dependency of the business application to the second router.

In an embodiment, the anticipation system is configured to consider a cost/benefit comparison of the "cost" and probability of non-conformance in light of the "cost" of migration, or shifting the application from the system resource that is statistically probable to non-conform to the alternate resource. As used herein, the term "cost" may refer to the change in overall data processing system 100 performance, as well as a possible financial cost, for example.

Continuing the above example, it will be appreciated that if there exists a 10 percent chance of non-conformance of the business application with a "cost" of non-conformance of the business application at 80 units, and a "cost" of 10 units is assessed to shifting the business application from the first router to the second router, the shift will not be considered to be worthwhile.

Figure 2:
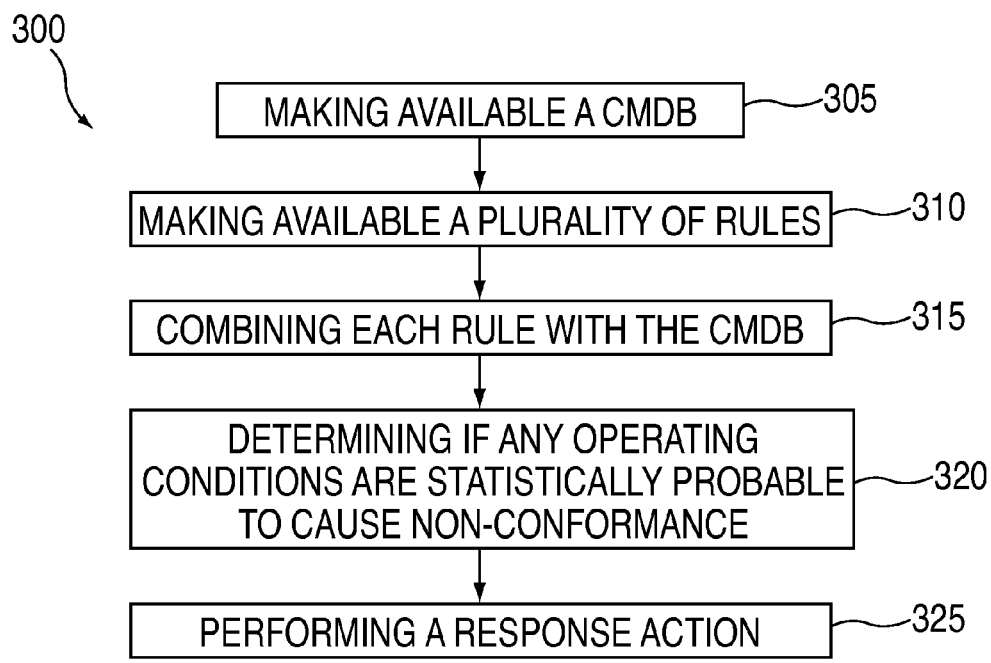
FIG. 2 illustrates one example of a flowchart of a method to anticipate and prevent application non-conformance.

In view of the foregoing, the CMDB-based non-conformance anticipation system performs the method of anticipating and preventing application non-conformance. Referring now to FIG. 2, an exemplary flowchart 300 depicting an embodiment of a method to anticipate and prevent application non-conformance is depicted.

The method begins with malting available 305 the CMDB, the CMDB including: configuration information of a plurality of system resources; and, dependency information of a plurality of applications related to the plurality of system resources. Also, making available 310 the plurality of rules to establish the plurality of operating conditions that are statistically probable to cause the non-conformance of each system resource of the plurality of system resources.

An embodiment of the method continues by combining 315 each rule of the plurality of rules with the CMDB to determine the dependency of each application upon each operating condition of the plurality of operating conditions. Following the combining 315 of the rules and the CMDB, determining 320 if any of the operating conditions are such that will result in the statistically probable non-conformance of any of the plurality of applications. In an embodiment, the determining 320 comprises determining if any of the operating conditions are such that the statistically probable non-conformance of any of the plurality of system resources will result in the statistically probable non-conformance of any of the plurality of applications.

In an embodiment, the determining 320 if any operating conditions are statistically probable to cause application non-conformance comprises querying the plurality of system resources. In another embodiment, the determining 320 if any operating conditions are statistically probable to cause application non-conformance comprises querying the monitoring program configured to monitor and store the operating conditions of the plurality of resources.

In response to determining 320 that any of the operating conditions are such to cause the statistically probable non-conformance of any of the plurality of applications, performing 325 the response action. In an embodiment, the performing 325 the response action comprises notifying the administrator of the statistically probable application non-conformance resulting from the statistically probable resource non-conformance. Another embodiment includes performing the plurality of response actions, each response action corresponding to the different level of statistical probability of application non-conformance.

In another embodiment, the method further includes querying the CMDB to determine if the alternate resource may be utilized to support continued conformance of any of the plurality of applications determined to be statistically probable to non-conform. Following the determination that the alternate resource may be utilized to continue conformance of the application, shifting the dependency of the application that is statistically probable to non-conform to the alternate resource.

In an embodiment of the method, considering the cost-benefit factor is performed. The cost-benefit factor is related to the shifting of the dependency of the application that is statistically probable to non-conform as a result of the statistically probable system resource non-conformance.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A computer readable storage medium including computer executable instructions that when read and executed by a computer processor implement a method to anticipate and prevent application non-conformance, the method comprising:
   making available a configuration management database (CMDB) comprising:
      configuration information of a plurality of system resources; and
      dependency information of a plurality of applications related to the plurality of system resources;
   making available a plurality of rules to establish a plurality of operating conditions that are statistically probable to cause a non-conformance of each system resource of the plurality of system resources;
   combining each rule of the plurality of rules with the CMDB to determine the dependency of each application upon each operating condition of the plurality of operating conditions;
   determining if any of the operating conditions are such that will result in a statistically probable non-conformance of any of the plurality of applications; and
   in response to determining that any of the operating conditions are such to cause the statistically probable non-conformance of any of the plurality of applications, performing a response action, the response action comprising notifying a user that operating conditions are such to cause statistically probable non-conformance.

2. The computer readable storage medium of claim 1, wherein the determining if any of the operating conditions are such that will result in the statistically probable non-conformance of any of the plurality of applications comprises:
   determining if any of the operating conditions are such that a statistically probable non-conformance of any of the plurality of system resources will result in the statistically probable non-conformance of any of the plurality of applications.

3. The computer readable storage medium of claim 1, wherein the determining if any of the operating conditions are such that will result in the statistically probable non-conformance of any of the plurality of applications comprises:
   querying the plurality of system resources.

4. The computer readable storage medium of claim 1, wherein the determining if any of the operating conditions are such will result in the statistically probable non-conformance of any of the plurality of applications comprises:
   querying a monitoring program, the monitoring program configured to monitor and store the operating conditions of the plurality of resources.

5. The computer readable storage medium of claim 1, wherein the performing the response action comprises:
   notifying an administrator of the statistically probable application non-conformance resulting from the statistically probable resource non-conformance.

6. The computer readable storage medium of claim 1, further comprising:
   querying the CMDB to determine if an alternate resource may be utilized to support continued conformance of any of the plurality of applications determined to be statistically probable to non-conform; and
   shifting the dependency of the application that is statistically probable to non-conform as a result of the statistically probable system resource non-conformance to the alternate resource.

7. The computer readable storage medium of claim 1, further comprising:
   considering a cost-benefit factor of the shifting the dependency of the application that is statistically probable to non-conform as a result of the statistically probable system resource non-conformance.

8. The computer readable storage medium of claim 1, wherein the performing a response action comprises:
   performing a plurality of response actions, each response action corresponding to a different level of statistical probability of application non-conformance.

9. A data processing system configured to anticipate and prevent application non-conformance, the system comprising:
   a computer processor in communication with a computer readable storage medium having recorded thereon computer executable instructions that when read and executed by the computer processor implement:
   means for making available a configuration management database (CMDB) comprising:
      configuration information of a plurality of system resources; and
      dependency information of a plurality of applications related to the plurality of system resources;
   means for making available a plurality of rules to establish a plurality of operating conditions that are statistically probable to cause a non-conformance of each system resource of the plurality of system resources;
   means for combining each rule of the plurality of rules with the CMDB to determine the dependency of each application upon each operating condition of the plurality of operating conditions;
   means for determining if any of the operating conditions are such that will result in a statistically probable non-conformance of any of the plurality of applications; and means for performing a response action in response to determining that any of the operating conditions are such to cause the statistically probable non-conformance of any of the plurality of applications, the response action comprising notifying a user that operating conditions are such to cause statistically probable non-conformance.

10. The system of claim 9, wherein the means for determining if any of the operating conditions are such that will result in the statistically probable non-conformance of any of the plurality of applications comprise:
    means for determining if any of the operating conditions are such that a statistically probable non-conformance of any of the plurality of system resources will result in the statistically probable non-conformance of any of the plurality of applications.

11. The system of claim 9, wherein notifying a user further comprises:
    notifying an administrator of the statistically probable application non-conformance resulting from the statistically probable resource non-conformance.

12. The system of claim 9, further comprising:
    means for querying the CMDB to determine if an alternate resource may be utilized to support continued conformance of any of the plurality of applications determined to be statistically probable to non-conform; and
    means for shifting the dependency of the application that is statistically probable to non-conform as a result of the statistically probable system resource non-conformance to the alternate resource.

13. The system of claim 9, further comprising:
    means for considering a cost-benefit factor related to the shifting the dependency of the application that is statistically probable to non-conform as a result of the statistically probable system resource non-conformance.

14. The system of claim 9, wherein the means for performing a response action further comprises:
    means for performing a plurality of response actions, each response action corresponding to a different level of statistical probability of application non-conformance.

\* \* \* \* \*